Jan. 5, 1932. A. W. PRIEBE ET AL 1,840,251
MOVABLE GROUND OR CURRENT RETURN CONNECTIONS FOR USE
IN THE PROGRESSIVE ARC WELDING PROCESS
Filed Aug. 5, 1929 2 Sheets-Sheet 1

INVENTORS:
Arthur W. Priebe
and Julius B. Tiedemann
BY
ATTORNEY.

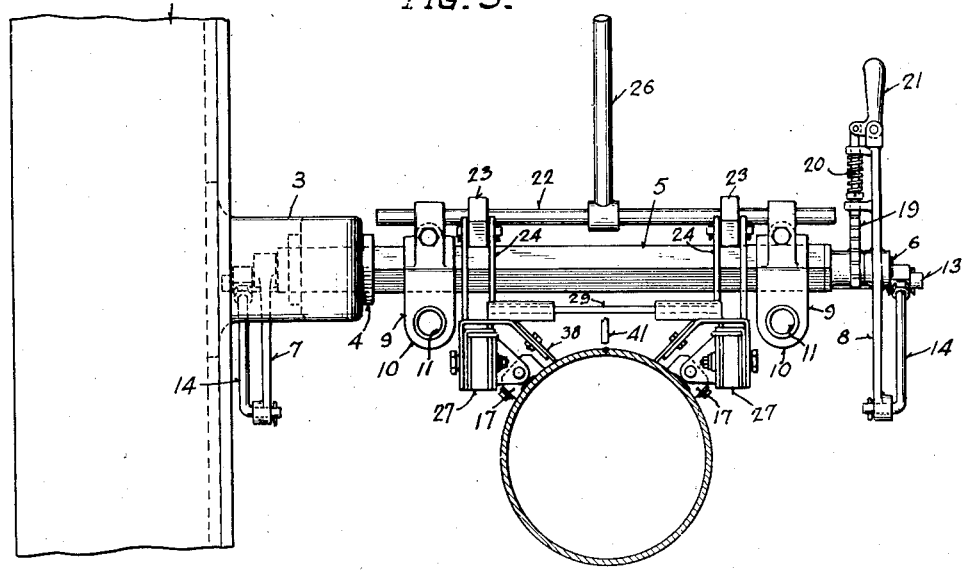
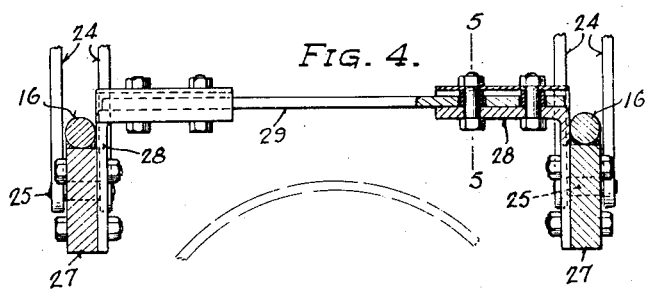
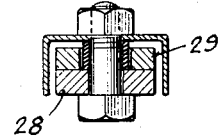
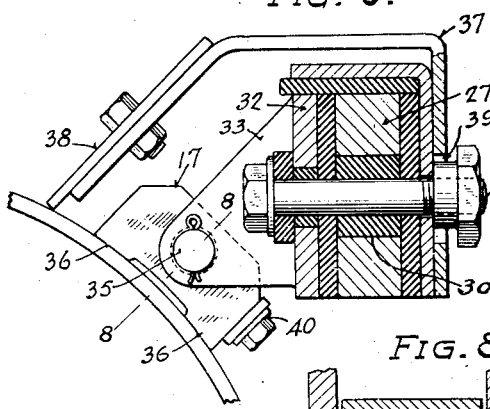
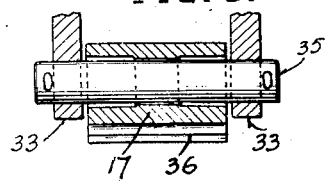
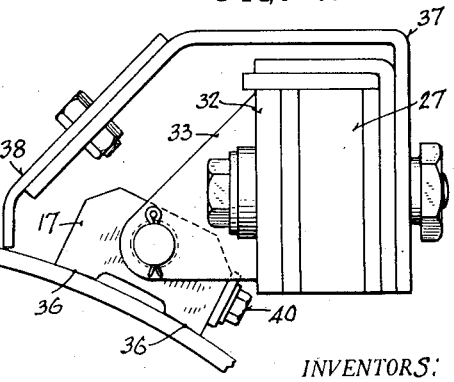
INVENTORS:
Arthur W. Priebe
and Julius B. Tiedemann Patented Jan. 5, 1932

1,840,251

UNITED STATES PATENT OFFICE

ARTHUR W. PRIEBE AND JULIUS B. TIEDEMANN, OF MILWAUKEE, WISCONSIN, ASSIGNORS TO A. O. SMITH CORPORATION, OF MILWAUKEE, WISCONSIN, A CORPORATION OF NEW YORK

MOVABLE GROUND OR CURRENT RETURN CONNECTIONS FOR USE IN THE PROGRESSIVE ARC WELDING PROCESS

Application filed August 5, 1929. Serial No. 383,434.

This invention relates to electric arc welding wherein one terminal of a source of welding current is connected to a fusible weldrod and the other terminal of the source is connected to the work piece. An electric arc is maintained between the fusible weldrod and the work piece, resulting in a deposition of the metal from the weldrod onto the work.

It has been found that the position of the ground terminal which connects the welding circuit with the work piece has a definite bearing on the stability and desired control of the arc and that for any given set of conditions a more rapid penetration of the arc, a conservation of heat therefrom, and a better fusion of the metal may be effected if the ground terminal is properly positioned with respect to the arc during the welding operation.

The position of the ground terminal with respect to the arc determines to some extent the direction of the welding current flowing through the work piece and the magnetic flux resulting from this current may have an adverse effect upon the desired stability and control of the arc.

One of the objects of the invention is to maintain proper magnetic flux conditions surrounding the arc to stabilize and control the same.

Another object of the invention is to provide an improved apparatus for maintaining a desired control and stabilization of the arc during the welding operation.

Another object is to provide a novel apparatus for connecting the ground terminal of a welding circuit to the article to be welded whereby the same may be readily adjusted and manipulated during the welding operation.

Other objects of the invention will appear in the following detailed description having particular reference to the accompanying drawings in which:

Fig. 3 is an end elevation taken on line 3—3 of Fig. 1.

Fig. 4 is a section taken on line 4—4 of Fig. 2.

Fig. 5 is a section taken on line 5—5 of Fig. 4.

Fig. 6 is a sectional view taken on line 6—6 of Fig. 2.

Fig. 7 shows a modification of the shield member shown in Fig. 6.

Fig. 8 is a section taken on line 8—8 of Fig. 6.

Figure 1:
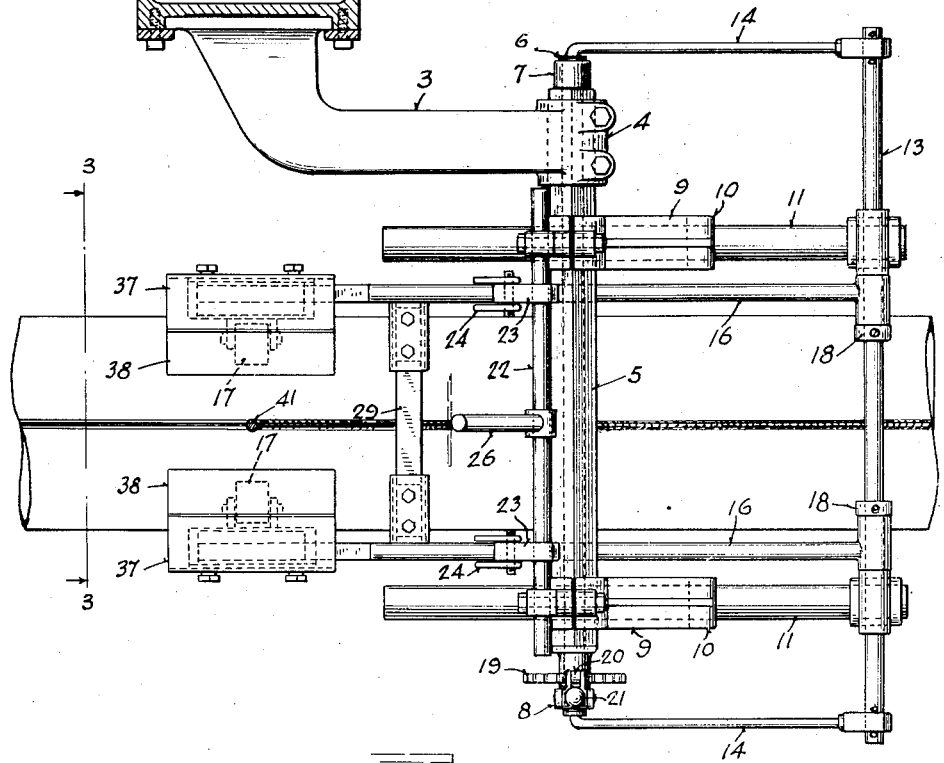
Figure 1 is a top plan view showing the invention as applied to the manufacture of sheet metal pipe.
Figure 2:
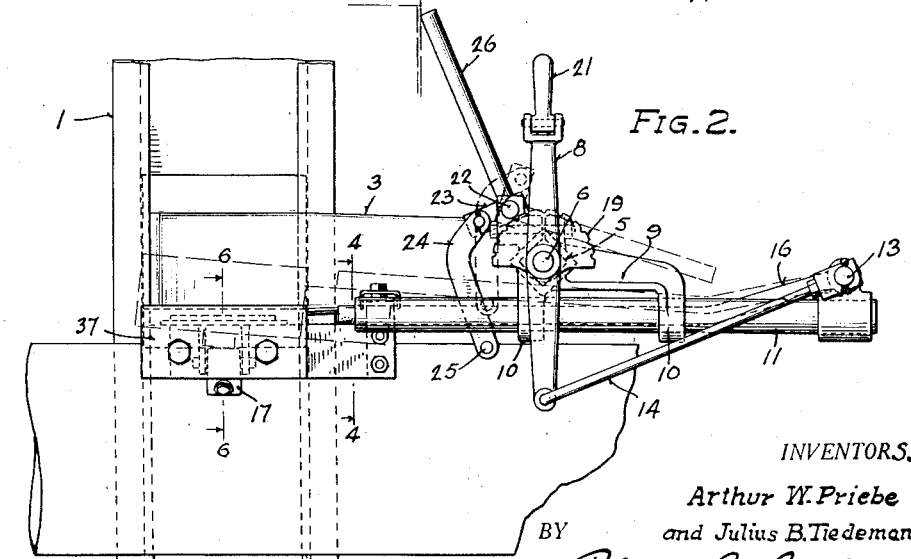
Fig. 2 is a side elevation thereof.

In the accompanying drawings, the numeral 1 indicates a conventional supporting post for a welding head (not shown). Vertically adjustable on the supporting post is a bracket 3 which is adapted to support the ground terminal connections which are more specifically described hereinafter. The free end of the bracket 3 is provided with a suitable aperture 4 in which a rectangular tubular member 5 is adapted to be clamped, which tubular member extends transversely of the welding machine and pipe to be welded, as illustrated in Fig. 3. A shaft 6 is suitably journaled in the rectangular tubular member 5, one end of which shaft is connected to a lever 7 and the other end to an intermediate portion of a hand lever 8.

The tubular member 5 has mounted thereon a pair of longitudinally adjustable brackets 9—9 each of which has a pair of aligned journals 10—10 in which a pair of longitudinally extending shafts 11—11 is adapted to reciprocate. The outer ends of the shafts 11—11 are connected by a transverse rod 13 and the ends of the transverse rod are pivotally connected to a pair of connecting rods 14—14, the free end of one of the connecting rods being pivotally connected to the lever arm 7 and the free end of the other connecting rod being pivotally connected to the lower end of the hand lever 8.

Rigidly secured to one end of the tubular member 5 is a ratchet 19 for receiving a spring pressed pin 20 which pin is adapted to be operated in a suitable manner by the handle 21 of the hand level 8. Adjustable and loosely mounted on the shafts 13 by means of collars 18—18 is a pair of spaced supporting arms 16—16 adapted to support the ground terminals 17—17 in a manner to be more fully described hereinafter.

The hand lever 8 may be operated to impart a reciprocating movement to the shafts 11—11 and the supporting arms 16—16 and thus effect a longitudinal adjustment of the ground terminals with respect to the pipe being welded. By means of the ratchet and spring pressed pin, the ground terminals may be maintained in any desired position.

Suitably journaled in the brackets 9—9 on the tubular member 5 is a rotatable shaft 22 on which is rigidly secured a pair of short levers 23—23, the free ends of which are pivotally connected to a pair of bell cranks 24—24. The opposite ends of the bell cranks are provided with pins 25—25 which are adapted to engage beneath the supporting arms 16—16 for the ground terminals.

Rigidly mounted on the shaft 22 is a handle 26 which may be operated to cause a raising and lowering of the ground terminals. The short levers 23—23 and the bell cranks 24—24 are preferably so proportioned that when the ground terminals are raised to extreme position, the pivotal center between the levers and the bell cranks will be past the center of the rotatable shaft 22 and the grounds may then be maintained in raised position by reason of the off-center relationship.

The supporting arms 16—16 are welded or otherwise suitably connected to a pair of longitudinal supporting bars 27—27. The supporting bars are provided, at their points of connection with the supporting arms, with a pair of brackets 28—28 adapted to be loosely connected by means of bolts and slots as shown in Fig. 4 to a transverse bracing plate 29.

The supporting bars 27—27 are provided adjacent their free ends with enlarged openings 30—30 in which are adapted to be inserted bolts 31—31 for securing terminal brackets 32—32. These brackets may be insulated from the bars 27—27 in any suitable manner, as illustrated in Fig. 6. The terminal brackets 32—32 are preferably provided with a pair of spaced lugs 33—33 between which is adapted to be pivotally mounted the ground terminals 17—17 by means of pins 35—35.

The journal openings in the ground terminals are enlarged adjacent their ends to permit a certain amount of rocking movement of the terminals on the pins 35—35 as is clearly shown in Fig. 8. The ground terminals are preferably of U-shape to provide a pair of spaced bearing surfaces 36—36 which may be concaved to conform with the contour of the pipe being welded. The ground terminals are provided with suitable terminal bolts 40—40 for connecting the same to one terminal of an electric welding circuit. The ground terminals are preferably located at each side of the weldrod 41 and, by the adjustment provided, the terminals may be readily shifted longitudinally of the pipe in advance or in the rear of the weldrod.

Loosely mounted on the bolts 31—31 are a pair of shield supporting brackets 37—37 on which is adapted to be secured suitable shield members 38—38 which are for protecting the ground terminals from the heat and slag resulting from the welding operation. The shield members are preferably composed of copper in order to prevent adherence of slag to the surface thereof. In order that the shield members may at all times engage the surface of the article being welded, they are provided with enlarged openings 39—39 for receiving specially designed heads of the bolts 31—31. For welding pipes of larger diameters, it is preferable to provide a shield member of the shape shown in Fig. 6.

It is desirable to provide a certain amount of lost motion between the several connections hereinbefore described so that an effective contact may be maintained between the ground terminal and the pipe being welded, regardless of any surface irregularities which may be present in the pipe.

The manner of carrying out the invention may be explained as follows: By operating the hand lever 8, the ground terminals 17—17 are moved longitudinally of the pipe being welded and the position of the terminals with respect to the weldrod may be changed to vary the path of the welding current in the pipe and alter its resultant flux to accomplish the desired stability and control of the arc.

To this end, it is advisable to so control the arc as to direct the same to the edges immediately adjacent the forward wall of the deposited metal. In most instances, it is preferable to maintain the position of the ground slightly in advance of the weldrod but the exact position is determined by numerous factors.

In welding pipe of substantial length it has been found preferable to move the ground terminals farther ahead of the arc when starting the latter at the end of the pipe than during the welding at the center of the pipe, and to move the terminals to a position behind the arc as the latter approaches the other end of the pipe. In this manner the magnetic flux may be so controlled that the welding will be uniform throughout the length of the pipe.

Furthermore it has been found advisable to position the terminals differently when starting the arc than after the same is struck. When welding with several layers, as by several passes along the seam, it has been found preferable to set the terminals at different positions for the different passes of the arc. Other factors, such as changing contact pressures of the terminals, may also effect the desired position of the terminals with respect to the arc.

The ground terminals are maintained in electrical contact with the pipe at all times by means of the loose connections or lost motion between the several parts regardless of surface irregularities. The bearing surface of the ground terminals is maintained free from scale and slag resulting from the welding operation by the shields 38—38 and the terminals may be jarred by raising and lowering the same by means of the lever 26, to remove any slag which may collect on the bearing surfaces of the ground terminals.

When it is desired to insert or remove the welded pipe, the ground terminals are held in raised position by means of the off-center relationship between the pivotal axis of the bell cranks and the axis of the shaft 22.

What is desired to be secured by Letters Patent is:

1. In an apparatus for progressive arc welding the longitudinal seams of tubular articles, an electrode in arcing relation to the longitudinal edges to be welded, a pair of ground terminals disposed on opposite sides of the cleft to be welded and connecting the tubular articles with the source of welding energy, a shield member for protecting said terminals from the spatter of the welding arc, and means for adjusting the position of said terminals relative to said electrode to control the arc.

2. In an apparatus for progressive arc welding tubular articles, an electrode in arcing relation to the edges to be welded, a supporting post, a vertically adjustable bracket mounted on said post, means mounted on said bracket for supporting a pair of ground terminals, ground terminals connected to said means and disposed on opposite sides of the cleft to be welded and adapted to connect the tubular article with one terminal of a welding circuit, and means for adjusting the position of said terminals relative to the electrode during the welding operation.

3. In an apparatus for electric arc welding, a ground terminal supporting arm, a bracket connected to said supporting arm, and a U-shaped ground terminal loosely connected to said bracket, the legs of said U-shaped terminal being adapted to provide a two-point contact with the parts to be welded.

4. In an arc welding apparatus, a ground terminal supporting arm, a ground terminal loosely connected to said arm and insulated therefrom, and means for reciprocating said supporting arm relative to the welding arc to effect a longitudinal adjustment of said ground terminal on the parts to be welded.

5. In an arc welding apparatus, a ground terminal supporting arm, a ground terminal connected to said supporting arm and insulated therefrom, means for reciprocating said supporting arm to effect a longitudinal adjustment of said terminal on the parts to be welded, and means for locking said arm in the desired longitudinal position.

6. In an arc welding apparatus, a ground terminal supporting arm, a ground terminal connected to and insulated from said supporting arm, means for reciprocating said supporting arm relative to the welding arc, and means for raising and lowering said ground terminal to bring the same into and out of contact with the parts to be welded.

7. In an arc welding apparatus, a ground terminal supporting arm, a ground terminal loosely connected to and insulated from said supporting arm, means for reciprocating said supporting arm to effect a longitudinal adjustment of said ground terminal on the parts to be welded, means for locking said arm in desired position, means for raising and lowering said terminals to bring the same into and out of contact with the parts to be welded, and arranged to maintain said terminals in either raised or lowered position.

8. In an arc welding apparatus, a pair of ground terminal supporting arms, ground terminals loosely connected to said supporting arms, reciprocating means loosely connected to said supporting arms to effect a longitudinal adjustment of said ground terminals on the parts to be welded relative to the welding arc, said loosely connected members cooperating to maintain desired electrical contact between the ground terminals and the parts irrespective of surface irregularities of the parts being welded.

9. In an apparatus for electric arc welding wherein an electrode is adapted to be maintained in arcing relation with the seam to be welded, a ground terminal connecting said article to the source of welding current, means for supporting said ground terminal independent of the electrode, and means for moving said ground terminal into and out of contact with the article being welded.

10. In an apparatus for electric arc welding wherein a fusible metallic electrode is adapted to be maintained in arcing relation to the work to be welded, a ground terminal connecting said work to a source of welding current, means for supporting said ground terminal, means for moving said support independently of the electrode to cause said terminal to move into and out of the path of the work to be welded, and means for holding said terminal out of the path of said work.

11. In an arc welding apparatus wherein an electrode is adapted to be maintained in arcing relation to the work to be welded, a ground terminal for connecting said work to the source of welding current, means for adjusting the position of said terminal relative to said electrode, and means for moving said terminal into and out of contact with the work to be welded.

12. In an arc welding apparatus wherein an electrode is adapted to be maintained in arcing relation to the work to be welded, a ground terminal for connecting said work to a source of welding current, means for adjusting the position of said terminal relative to said electrode, means for moving said terminal into and out of contact with the work to be welded, and means for holding said terminal out of contact with the work to be welded.

In witness whereof we have signed our names at Milwaukee, Wisconsin, this 31st day of July, 1929.

ARTHUR W. PRIEBE.
JULIUS B. TIEDEMANN.